(12) United States Patent
Uenishi et al.

(10) Patent No.: US 7,810,238 B2
(45) Date of Patent: Oct. 12, 2010

(54) OPTIMUM NUMBER OF TEETH SETTING METHOD FOR HELICAL GEAR PAIR AND HELICAL GEAR PAIR MANUFACTURED BY THIS METHOD

(75) Inventors: Yasuhiro Uenishi, Aichi (JP); Toshiki Hirogaki, Kyoto (JP); Eiichi Aoyama, Osaka (JP); Yuusuke Nakano, Tokyo (JP)

(73) Assignees: Jatco Ltd, Fuji-shi (JP); The Doshisha, Kyoto-shi (JP)

( * ) Notice: Subject to any disclaimer, the term of this patent is extended or adjusted under 35 U.S.C. 154(b) by 1121 days.

(21) Appl. No.: 11/376,739

(22) Filed: Mar. 16, 2006

(65) Prior Publication Data

US 2007/0067992 A1    Mar. 29, 2007

(30) Foreign Application Priority Data

Sep. 16, 2005  (JP)  ............................ 2005-270261

(51) Int. Cl.
*B21D 53/28*   (2006.01)
*G01M 19/00*   (2006.01)

(52) U.S. Cl. ..................... 29/893; 29/893.3; 29/407.1; 74/458

(58) Field of Classification Search .................... 29/893, 29/893.2, 893.3, 893.35, 407.01, 407.05, 29/407.1; 74/458
See application file for complete search history.

(56) References Cited

U.S. PATENT DOCUMENTS 3,765,303 A  *  10/1973  Fischer et al. .................. 409/31
4,236,407 A  *  12/1980  Alpini et al. ............. 73/115.06
4,495,830 A  *   1/1985  Yasue et al. .................... 74/467
5,842,947 A     12/1998  Weilant
6,012,350 A      1/2000  Mizuta et al.
7,665,380 B2 *   2/2010  Honda ........................ 74/458

FOREIGN PATENT DOCUMENTS

JP      2004-252754 A       9/2004

OTHER PUBLICATIONS

Machine Translation of JP2004-25275A, Sep. 2004.*
H. Maki, "A Study on Optimum Tooth Modifications of Helical Gears under Various Loads," SAE Paper 1999011053, 1999, pp. 257-261.

(Continued)

*Primary Examiner*—David P Bryant
*Assistant Examiner*—Ryan J Walters
(74) *Attorney, Agent, or Firm*—Foley & Lardner LLP

(57)  ABSTRACT

In optimum number of teeth setting method for a helical gear pair and the helical gear pair manufactured on the basis of the set optimum number of teeth of each helical gear of the helical gear pair, a sound pressure level of a gear sound is compared with the sound pressure level of an audible limit with respect to a meshing frequency of the helical gear pair at a predetermined vehicle speed of an automotive vehicle in which the helical gear pair is mounted to select a frequency region in which the calculated sound pressure of the gear sound is relatively low to the sound pressure level of the audible limit, and number of teeth of each helical gear of the helical gear pair corresponding to the selected frequency region is set to an optimum number of teeth of each helical gear of the helical gear pair.

10 Claims, 9 Drawing Sheets

OTHER PUBLICATIONS

M. Komori et al., "Design Method of Vibrationally Optimum Tooth Flank Form for Involute Helical Gears with Scattering in Pressure Angle and Helix Angle Deviation," Japan Society of Mechanical Engineers, Paper Series C, vol. 66, 646 (2000-6) No. 99-1497, 1999, pp. 229-236.

M. Komori, Japanese Thesis entitled "Method of Both Optimum Design in Vibration and Strength of Power Transmission Involute Cylindrical Gear," 2002.

M. Miyazawa, et al., "Low Noise Gear Design Method Considering Human Engineering," No. 80 Lecture Papers, No. 054-1, Mar. 18, 2005, pp. 13-9-13-10.

T. Nakata, "Involute Profile Shifted Gears," Japanese Society of Mechanical Engineers, 1994, pp. 74-81.

* cited by examiner

FIG.1

SELECTING METHOD OF OPTIMUM NUMBER OF TEETH OF HELICAL GEAR

- S10: GEAR DIMENSIONS DETERMINING STEP
  - PRESSURE ANGLE AND HELIX ANGLE ARE DETERMINED FROM GEAR RATIO, INTER-CENTER DISTANCE OF GEAR PAIR, AN EASINESS IN PROVIDING TOOTH PROFILE ACCURACY IN SHAVING PROCESS, TOOL LIFE AND SO FORTH
- S20: CONTACT RATIO CALCULATING STEP
  - A RELATION EQUATION IS CALCULATED BETWEEN NUMBER OF TEETH AND CONTACT RATIO USING A VALUE CALCULATED AT GEAR DIMENSIONS DETERMINING STEP (S10). AT THIS TIME, A HELICAL GEAR USED IN AN AUTOMATIC TRANSMISSION (AT) CAN BE REPRESENTED IN A LINEAR FORM.
  $\varepsilon = Ca \cdot \ln(Z) + Cb(Z) + Cc$ ($Ca, Cb$, AND $Cc$ DENOTE CONSTANTS AND $Z$ DENOTES THE NUMBER OF TEETH).
- S30: GEAR NOISE SOUND PRESSURE LEVEL CALCULATING STEP
  - A SOUND PRESSURE LEVEL OF GEAR NOISE OF GEAR PAIR WITH RESPECT TO FREQUENCY IS CALCULATED USING THE RELATION EQUATION BETWEEN NUMBER OF TEETH AND CONTACT RATIO CALCULATED AT CONTACT RATIO CALCULATING STEP (S20).
  $Lg = Te/(Ca \cdot \ln(Z) + Cb(Z) + Cc)$ ($Ca, Cb$, AND $Cc$ DENOTE CONSTANTS, $Z$ DENOTES NUMBER OF TEETH, AND $Te$ DENOTES TEETH PROFILE ERROR DISCRETE VALUE)
- S40: FREQUENCY DETERMINING STEP
  - A FREQUENCY REGION IN WHICH ALLOWANCE LEVEL $\Delta Lg$ BECOMES MAXIMUM IS CALCULATED BY COMPARING SOUND PRESSURE LEVEL CALCULATED AT GEAR NOISE SOUND PRESSURE LEVEL CALCULATING STEP (S30) WITH AUDIBLE LIMIT OF VEHICLE WITH RESPECT TO FREQUENCY AT A PREDETERMINED VEHICLE SPEED. IT IS NOTED THAT THE AUDIBLE LIMIT AT THE PREDETERMINED VEHICLE SPEED IS PREVIOUSLY MEASURED AND SET. IT IS ALSO NOTED THAT THE PREDETERMINED VEHICLE SPEED IS PREFERABLY SET FOR EACH VEHICLE AND ACCORDING TO AN AGE GROUP OF A USER WHO PURCHASED THE VEHICLE.
- S50: OPTIMUM NUMBER OF TEETH CALCULATING STEP
  - SINCE A MESHING FREQUENCY F = DRIVING SIDE GEAR NUMBER OF TEETH $Z \times$ NUMBER OF REVOLUTIONS PER UNIT TIME $N(rpm)/60$, THE NUMBER OF TEETH CAN BE CALCULATED IF THE MESHING FREQUENCY IS DETERMINED.
- END

OPTIMUM NUMBER OF TEETH SETTING METHOD FOR HELICAL GEAR PAIR AND HELICAL GEAR PAIR MANUFACTURED BY THIS METHOD

BACKGROUND OF THE INVENTION

The present invention relates to a setting method of an optimum number of teeth of each helical gear of a helical gear pair and the helical gear pair whose numbers of teeth are set according to the setting method.

Recently, a performance requirement for a gear sound (gear noise) in an automotive vehicle tends to become more strict year by year. Especially, the gear noise catches human's ears due to its dull sound. Thus, a specification requirement of the noise in the gear mounted in the vehicle tends to become more strict year by year. A gear noise performance is, as different from dynamic performances of other mechanical elements, largely dependent upon not only a gear design but also a gear manufacturing method or a working accuracy (a manufacturing quality) and is dependent upon a passenger compartment environment during a driving of the gear.

As a gear noise countermeasure to cope with an industrial demand such as described above, a rib reinforcement into a gear case (box) and an addition of a shielded material or mass onto a vehicle body are generally carried out so that the countermeasures to suppress vibrations of a surrounding member due to an exciting force of the gear and to suppress a transmission of the developed gear sound. In recent years, a robust gear design with a manufacturing error developed during a manufacturing process of the gear taken into consideration is carried out to make an influence of a tooth flank error variation on a transmission error of gears (meshing error) dull and to add a gear finishing process after a heat treatment. Thus, the gear sound (noise) itself is reduced. These countermeasures are described in a Japanese thesis of a degree of Kyoto University titled Method of Both Optimum Design in Vibration and Strength of Power Transmission Involute Cylindrical Gear authored by Masaharu Komori in 2002, SAE Paper 1999011053 (a study on Optimum Tooth Modifications of Helical Gears under Various Loads) in 1999 by Hiroki MAKI, and a paper series C (volume No. 66, 646 (2000-6) No. 99-1497) of the Japan Society of Mechanical Engineers by Masaharu KOMORI et al in 1959.

SUMMARY OF THE INVENTION

However, countermeasures such as the rib reinforcement onto the gear case, the addition of the shielded material or mass onto the vehicle body lead to an increase in a number of parts and an increase in weight. In addition, the addition of the robust gear design and gear finishing process is to reduce the transmission error of gears (meshing error) to reduce the exciting force, in other words, has an object to reduce an absolute value of the gear sound. Although these countermeasures can provide drastic gear sound (noise) countermeasures, a burden imposed on a gear machining and on a gear assembling becomes very large.

In addition, a reduction of an absolute value in the gear sound (noise) does not always obtain a noise reduction effect. An unpleasant feeling that a human gets from a certain sound as the noise is not merely due to a large magnitude of an absolute value of the sound pressure level of the certain sound but is due to a larger magnitude of the sound pressure level than a background noise sound pressure level by a constant sound pressure difference or larger, in a frequency region of that sound.

In details, humans feel unpleasant only when the sound pressure level of the sound to be a hearing object becomes a level (audible limit line) equal to or higher than the constant sound pressure difference as compared with the background noise at the same frequency region. On the contrary, even if the absolute value of the gear noise (sound) at the certain frequency region becomes large and if the noise level at the certain frequency region is relatively and sufficiently high, the gear sound does not provide the noise.

For example, in a case of the automotive vehicle, the sound pressure level of the background noise becomes larger at a lower frequency region. Hence, at a low frequency region, a masking effect is exhibited due to a rise in the audible limit line. That is to say, at the low frequency region, the gear sound does not provide the noise due to the masking effect even if the sound pressure level of the gear sound is relatively high. However, at a high frequency region, the gear sound provides the noise due to a small masking effect even if the sound pressure level of the gear sound is relatively low.

Since each of previously proposed techniques described above is provided without such a human's aural characteristic taken into consideration as described above, these techniques do not always reduce effectively the gear noise. In the case of each previously proposed technique, for example, in order to reduce the absolute value of the gear noise, it is effective to reduce the transmission error of gears (meshing error). The number of teeth is often increased to reduce the transmission error of gears. In this case, a projection quantity from the audible limit (audibility) line, in turn, becomes large and there is a possibility that the noise may be promoted. Hence, an unnecessary gear finishing in a substantial noise reduction countermeasure with the human's aural characteristic taken into consideration is needed to be carried out. In spite of the fact that the noise reduction effect is not obtained, an increase in a working labor-hour due to the unnecessary gear finishing and a cost increase are brought out.

It is, hence, an object of the present invention to provide an optimum number of teeth setting method for a helical gear pair and the helical gear pair which can reduce the unpleasant gear noise more effectively with the human's aural characteristic taken into consideration by setting the number of teeth of the helical gear to control the frequency of the gear sound not by reducing the transmission error of gears so as to reduce the gear noise as in the case of the previously proposed technique.

The above-described object can be achieved by providing a setting method for a helical gear pair, comprising: determining a gear ratio of the helical gear pair, an inter-center distance between centers of the helical gear pair, a pressure angle of the helical gear pair, and a helix angle of the helical gear pair; calculating a relationship between a contact ratio of the helical gear pair and a number of teeth of each helical gear of the helical gear pair on the basis of the determined gear ratio, inter-center distance, pressure angle, and helix angle; calculating a sound pressure level of a gear sound of the helical gear pair at a meshing frequency of the helical gear pair from the relationship between the number of teeth of each helical gear of the helical gear pair and the contact ratio; comparing the calculated sound pressure level of the gear sound with the sound pressure level of an audible limit with respect to the meshing frequency of the helical gear pair at a predetermined vehicle speed of an automotive vehicle in which the helical gear pair is mounted to select a frequency region in which the calculated sound pressure of the gear sound is relatively low to the sound pressure level of the audible limit; and setting the number of teeth of each helical gear of the helical gear pair corresponding to the selected frequency region to an optimum number of teeth of each helical gear of the helical gear pair.

The above-described object can also be achieved by providing a manufacturing method for a helical gear pair, comprising: determining a gear ratio of the helical gear pair, an inter-center distance between centers of the helical gear pair, a pressure angle of the helical gear pair, and a helix angle of the helical gear pair; calculating a relationship between a contact ratio of the helical gear pair and a number of teeth of each helical gear of the helical gear pair on the basis of the determined gear ratio, inter-center distance, pressure angle, and helix angle; calculating a sound pressure level of a gear sound of the helical gear pair at a meshing frequency of the helical gear pair from the relationship between the number of teeth of each helical gear of the helical gear pair and the contact ratio; comparing the calculated sound pressure level of the gear sound with the sound pressure level of an audible limit with respect to the meshing frequency of the helical gear pair at a predetermined vehicle speed of an automotive vehicle in which the helical gear pair is mounted to select a frequency region in which the calculated sound pressure of the gear sound is relatively low to the sound pressure level of the audible limit; setting the number of teeth of each helical gear of the helical gear pair corresponding to the selected frequency region to an optimum number of teeth of each helical gear of the helical gear pair; and manufacturing the helical gear pair on the basis of the set optimum number of teeth of each helical gear of the helical gear pair.

The above-described object can also be achieved by providing a helical gear pair manufactured by the following steps of: a gear dimensions determining step to determine a gear ratio of the helical gear pair, an inter-center distance between centers of the helical gear pair, a pressure angle of the helical gear pair, and a helix angle of the helical gear pair; a contact ratio calculating step to calculate a relationship between a contact ratio of the helical gear pair and a number of teeth of each helical gear of the helical gear pair on the basis of the determined gear ratio, inter-center distance, pressure angle, and helix angle; a sound pressure calculating step to calculate a sound pressure level of a gear sound of the helical gear pair at a meshing frequency of the helical gear pair from the relationship between the number of teeth of each helical gear of the helical gear pair and the contact ratio; a frequency selecting step to compare the calculated sound pressure level of the gear sound with the sound pressure level of an audible limit with respect to the meshing frequency of the helical gear pair at a predetermined vehicle speed of an automotive vehicle in which the helical gear pair is mounted to select a frequency region in which the calculated sound pressure of the gear sound is relatively low to the sound pressure level of the audible limit; and an optimum number of teeth setting step to set the number of teeth of each helical gear of the helical gear pair corresponding to the selected frequency region to an optimum number of teeth of each helical gear of the helical gear pair.

Next, a technical concept of the present invention will be described with reference to FIG. 2. FIG. 2 shows an explanatory view of a vehicle passenger compartment noise of an automotive vehicle in which a gear pair developing the gear noise is mounted In an inside of the vehicle passenger compartment, for example, various sound source's sounds such as a wind noise, a road (surface) noise picked up from tires on a road surface, an engine noise, and other booming noises enter and are mixed together. Thus, a background noise as shown in FIG. 2 is developed. When, in the background noise, a particular sound is a dull sound whose sound pressure level is projectively (or remarkably) larger than the background noise, a human kind feels this particular sound to be an unpleasant sound (namely, noise) but does not feel this particular sound to be the unpleasant sound (noise) if the projection quantity of this particular sound from respect to the background noise is small. In other words, an audible limit (audibility) is provided at a line portion in FIG. 2 whose sound pressure level is to some degree higher than that of the background noise. If the particular sound becomes equal to or higher than this audible limit, the human kind feels it as the noise.

Suppose now that, as the gear noise, the sound pressure level is A at a lower frequency (gear sound a), as the other gear noise, the sound pressure level is B at a frequency higher than that of sound pressure level A, the mixed noises are invaded into the vehicular passenger compartment. In this case, absolute values A, B (gear sound itself) of the gear sound may principally be considered to be a function of a contact ratio. As the contact ratio becomes smaller, absolute values of A and B of the gear sounds becomes larger. In general, if number of teeth are set to be smaller (namely, if the frequency of the gear sound is set to be lower), the contact ratio becomes reduced. Hence, when sound pressure level A of gear sound a whose frequency is relatively low is compared with sound pressure level B of gear sound b whose frequency is relatively high, A>B. However, with the audible limit taken into consideration, the sound pressure level at the low frequency region is higher than that at the high frequency region. Hence, for absolute values of A and B of the gear sounds, A>B. Even if this inequality is established, a relationship between relative magnitudes of the gear sounds with respect to the audible limit, namely, the relationship between $\Delta A$ (=A−sound pressure level of the audible limit at the corresponding frequency) and $\Delta B$ (=B−sound pressure level of the audible limit at the corresponding frequency) is often expressed as follows: $\Delta A<\Delta B$.

Thus, with the relative magnitudes of the gear sounds with respect to the audible limit taken into consideration, the number of teeth of each gear of the gear pair is set in such a manner that the sound pressure level of the gear sound is relatively low with respect to the audible limit so that, in terms of the human's aural characteristic, the gear noise becomes difficult to be heard.

This summary of the invention does not necessarily describe all necessary features so that the present invention may also be a sub-combination of these described features.

BRIEF DESCRIPTION OF THE DRAWINGS

FIG. 1 is a flowchart for explaining an optimum number of teeth setting method for a helical gear pair in a preferred embodiment according to the present invention.

DETAILED DESCRIPTION OF THE INVENTION

Figure 2:
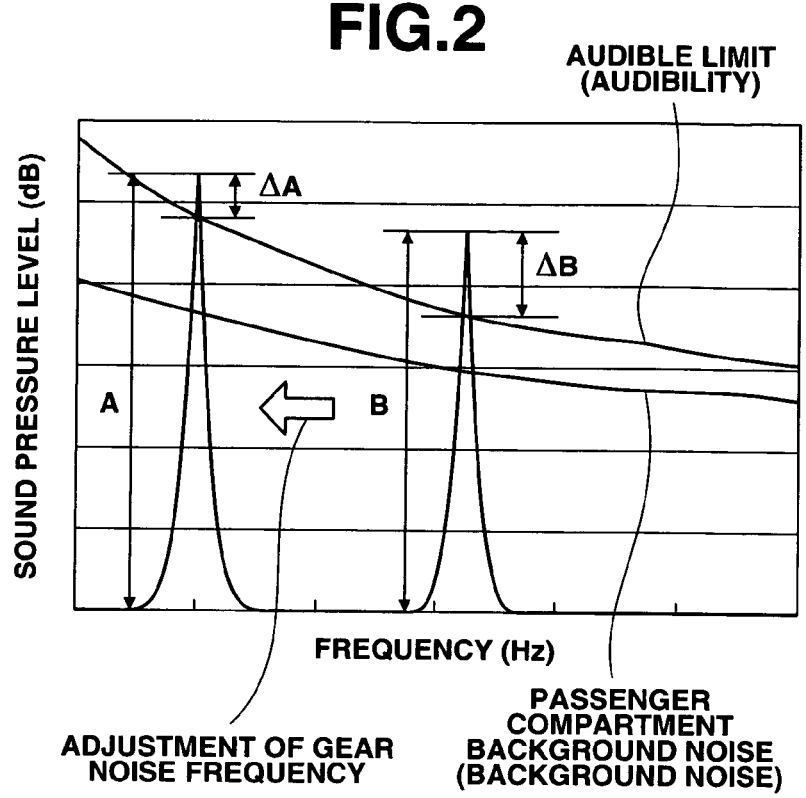
FIG. 2 is a frequency characteristic graph for explaining an evaluation of a gear sound and a technical concept of the present invention.
Figure 3:
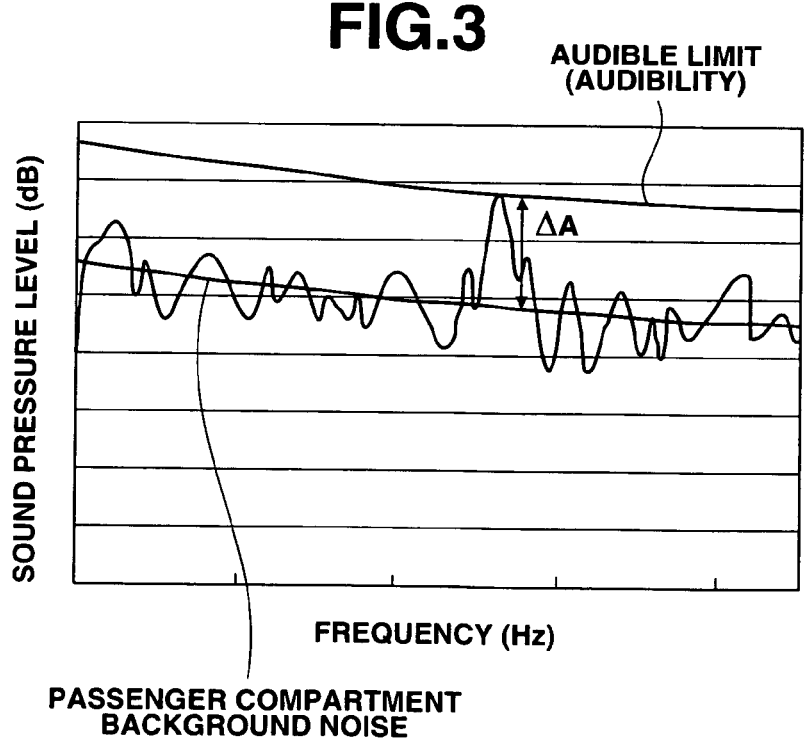
FIG. 3 is a frequency characteristic graph for explaining a measurement of the gear sound in the embodiment according to the present invention.

Reference will hereinafter be made to the drawings in order to facilitate a better understanding of the present invention.

FIGS. 1 through 16 show explanatory views for explaining a preferred embodiment of an optimum number of teeth setting method for a helical gear according to the present invention.

1. A Concept of the Helical Gear Optimum Number of Teeth Setting Method.

1.1 General

As described above with reference to FIG. 2, in the present invention, the number of teeth of the gear pair according to which a frequency region in which the gear sound is masked by the background noise from the aural characteristic of the human kind is provided are set to the optimum number of teeth. The gear noise is defined as a projection quantity of a pure sound from the audible limit, the projection quantity being an index value indicating a discomfort index (degree) from the human's aural characteristic. Then, an attention is paid to the gear noise. This gear noise is indicated by projection quantities $\Delta A$ and $\Delta B$ from the audible limit (refer to FIG. 2). The projection quantity is defined as a deviation of the sound pressure level from the audible limit value at the same frequency. The numbers of teeth of the gear pair are set so that the frequency of the gear sound falls in a frequency region in which these projection quantities $\Delta A$ and $\Delta B$ indicate minus (namely, each sound pressure level of the gear noise is lower than the audible limit) or, even in a region in which these projection quantities $\Delta A$ and $\Delta B$ indicate minus, the frequency of each gear noise falls in a frequency region in which the sound pressure level of the gear sound is relatively lowest to the audible limit.

1.2 Various Measurement Devices and Measurement Methods (a) Measurement condition of the sound pressure level. As will be described hereinbelow, the explanation of the embodiment of the setting method is made using sound pressure level actual measurement data. A sound level meter (LA1210 manufactured by Ono Sokki) was used. A measurement range of this sound (pressure) level meter is 37 dB through 130 dB, in a sampling period of 32 microseconds ($\mu S$), and at a resolution of 0.1 dB. The data measured by the sound level meter was frequency analyzed by means of an FFT (Fast Fourier Transform) analyzer (CF-350 manufactured by Ono Sokki). A power spectrum of the FFT analyzer used herein was ±0.1 dB in a Y-axis resolution, 32 times in an X-axis resolution, and ±0.3 dB or lower in an amplitude flatness.

(b) Detection method for an object sound under a background noise. In addition, since the frequency control of the gear sound with the masking (effect) taken into consideration is the object, the sound pressure level measurement was carried out using a technique called "Projection Quantity Detection of an Object Sound Under the Background Noise". This technique is detection and measurement of the projection quantity of the object sound from the background noise at each predetermined frequency, as appreciated from a conceptual view of FIG. 3. In a case shown in FIG. 3, the projection quantity from the background noise corresponds to $\Delta A$. The data of the vehicular compartment inside sound during the traveling at each running condition previously recorded with a DAT (Digital Audio Tape) data recorder (RD-130TE manufactured by TEAC corporation) under a state in which the sound level meter was installed at a center of a front seat of the vehicular compartment was used as the background noise.

Figure 4:
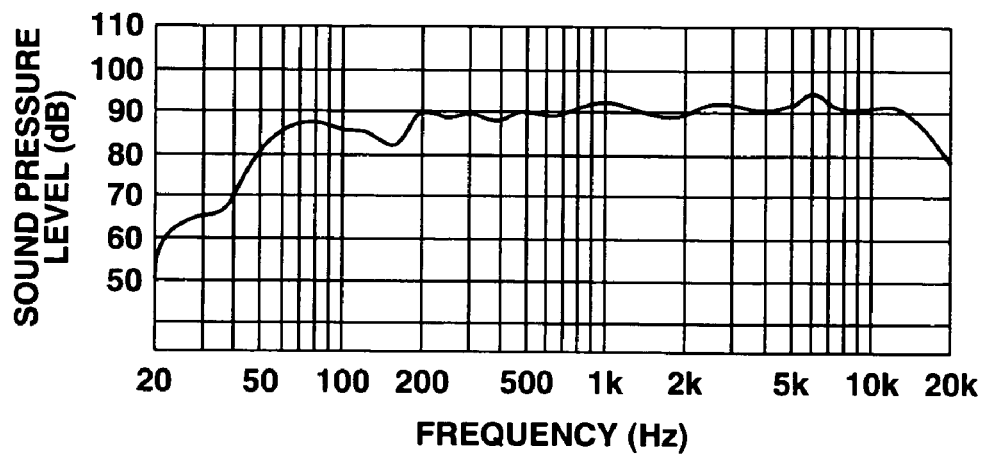
FIG. 4 is a frequency characteristic graph of a speaker used in the measurement of the gear noise.

It is noted that the gear sound is not a perfect pure sound (pure tone) but an approximately pure sound (pure tone). Hence, the gear sound was treated as the pure sound (tone) and is replaced with a sinusoidal wave generated from a sampling generator. Then, outputs from the sampling generator and DAT recorder are amplified by means of power mixing amplifiers (2705 MX manufactured by Bose corporation) whose outputs are separately outputted from separate speakers (12 centimeter cone-shape full range speaker FE127). It is herein noted that the frequency characteristic of each of the speakers used in this measurement was as shown in FIG. 4 and have relatively flat frequency characteristic.

1.3 Aural Characteristic (a) Human's audition (aural) (sense of hearing) characteristic (An equi-loudness curve under the background noise).

According to JIS (Japanese Industrial Standard), a sound which a human kind feels uneasy (unpleasant) and an undesired (unwanted) sound is defined as the noise. In details, even if a beautiful music is heard but if a person who is listening the music feels unpleasant, the music is the noise for this person. In addition, a loud sound is the noise for many persons but even if a volume thereof is small, some persons often have a sense of repugnance for the sound having a certain particular frequency. They have a sense such that a sound whose frequency is the proximity to 100 Hz is dislike or a sound whose frequency is in the proximity to 400 Hz is dislike. Although many persons are the latter, several persons become nervous to a low sound range (low compass).

That is to say, the noise is classified into the uneasy sound, a sound different from a preconceived idea, a loud sound, an unpleasant frequency sound, an object hindering sound, an anxiety associated sound, a dislike tone sound, and so on and a general term of these sounds can be said to be the noise.

Figure 5:
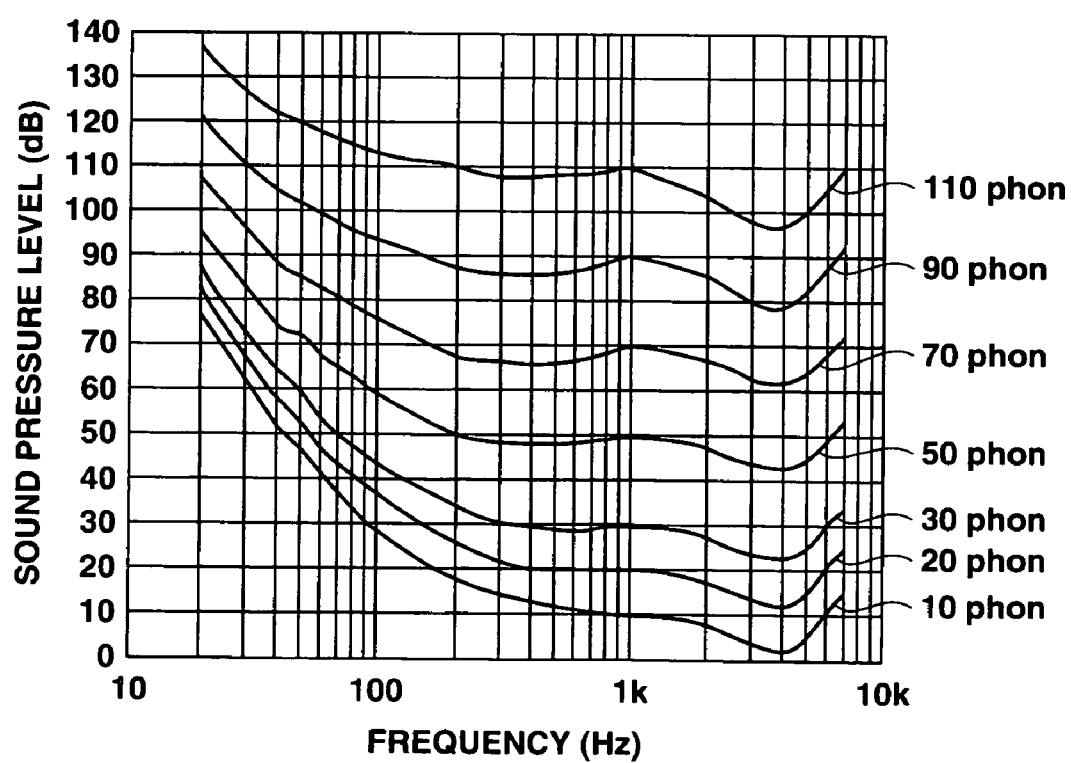
FIG. 5 is an equi-loudness curve for explaining a human's aural characteristic.

In this way, the noises are sounds dependent upon complex physiological and psychological factors. Hence, it is very difficult to evaluate the noises. In addition, the magnitude of sound is not simply proportional to a strength of sound and the sound pressure. The human's sense for a low-frequency sound is different from the sense for a high sound (tone). Hence, if the frequencies are different even at the mutually same sound pressure levels, such a sense that they are at the same magnitude is not given. As far as magnitude of sound (loudness) perceived by the human's audition is concerned, a level of a sound at a single frequency (namely, a loudness level) prepared as a unit derived through many experiments. Its magnitude is expressed as phon. It is prescribed that a numerical value of a unit phon representing the magnitude of the sound is expressed in the sound pressure level of a pure sound having 1000 Hz that a person who has a normal hearing ability determines that he can hear it at the same magnitude (loudness). The equi-loudness curve shown in FIG. 5 represents the sound pressure level at which the human kind perceives as the same loudness sound.

This equi-loudness curve is prepared by Fletcher-Munson under average values measured by many people and is also called an equi-sense curve by Fletcher-Munson. Thereafter, a re-measurement was made by Robinson. In FIG. 5, a longitudinal axis denotes a sound pressure level (dB) and a lateral axis denotes a frequency. All of sounds on the same curve indicate the same loudness (magnitudes) and a value of phon described on each curve is coincident with a value in dB at 1000 Hz. For example, reviewing one of the curves described as 50 phon, at a portion of 1000 Hz in the lateral axis, the sound pressure level in the longitudinal axis is 50 (dB) which is the same as 50 value of the phon. However, at the portion of the curve at 100 Hz, the sound pressure level is about 60 dB. This means that the pure sound having 50 dB at 1000 Hz is heard at the same magnitude as the pure sound having 60 dB at 100 Hz. Further careful review of these curve group in FIG. 5 will appreciate that as the level becomes larger, the frequency characteristic becomes more flat. However, since, at a small level, the curves at the low sound portion are raised, it is appreciated that the sense of ears (hearing) at a low frequency region becomes dull and the sense of the human's hearing is keenest in the vicinity to 4000 Hz.

(b) Vehicular passenger compartment sound environment during the run of the vehicle. In general, a vehicle driver hears the vehicular passenger compartment sound under various running situations at which a traveling speed and a road surface state are different. Then, under various traveling situations, the vehicular passenger compartment sound is heard as the sound having a very different quality. This is because, dependent upon the running situation, magnitude, tone, and construction percentage of sound elements constituting the vehicular passenger compartment sound such as engine noise and wind noise are dynamically varied. That is to say, it is very important to take various running situations into consideration and to grasp a sound quality for each of the running situations in order to evaluate the vehicular passenger compartment sound in accordance with factual events in which a user hears the vehicular passenger compartment sound during a daily running.

Various sounds are generated within the passenger compartment while the vehicle travels. The vehicular passenger compartment sound is constituted by these kinds of sounds. In this section, the various sounds constituting the vehicular passenger compartment sound are called herein elements of sounds. A representative of the sound elements is four elements of (element 1) engine noise, (element 2) booming noise, (element 3) a noise from a road surface, and (element 4) a wind noise.

(Element 1) The engine noise is a composite period sound with 0.5 order component of an engine speed as a fundamental frequency and has a main frequency band which is equal to or lower than 5 kHz. (Element 2) The booming noise (sound) is a low frequency sound having a frequency band from 20 Hz to 250 Hz and is a sound as if tt were subjected from pressure to humans' ears. (Element 3) Road noise is a random noise developed between a road surface and each of tire wheels and has a principal frequency band is equal to or lower than 1 kHz (The road noise treated herein is not a road noise, in a narrow sense of the word, but developed during a run on a rough road surface). (Element 4) The wind noise is a random noise developed during the vehicular run at a high speed due to a disturbance of an air stream at a surrounding of the vehicle and the frequency band is from 500 Hz to 5000 Hz (It is noted that the wind noise treated herein is not such an intermittent wind noise as a rustling sound developed due to a variation in a wind direction or a variation in a wind speed).

Figure 6:
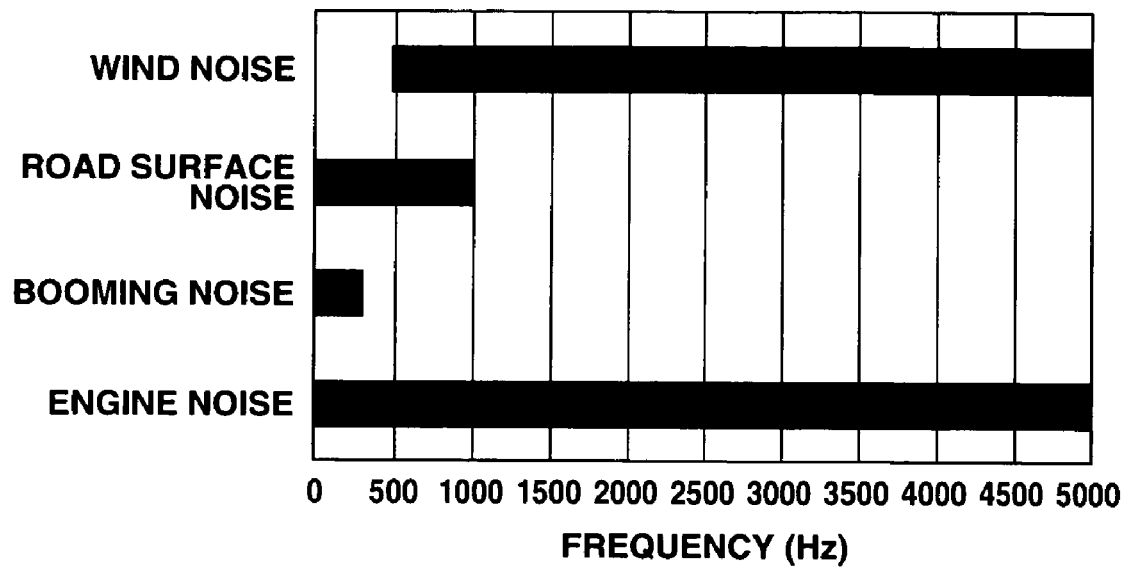
FIG. 6 is integrally a characteristic graph of each sound element of sound developed within a vehicular passenger compartment during a vehicular run of a vehicle in which the gear pair manufactured by the setting method in the preferred embodiment according to the present invention is mounted.

FIG. 6 roughly shows a relationship between each sound element and the frequency. If the sound elements during the traveling of the vehicle are considered for each of the running situations, the engine noise and booming noise are predominated during an acceleration or deceleration of the vehicle and the rough road surface noise and a road surface noise during a high speed steady running. In addition, it becomes apparent that the wind noise becomes remarkable in terms of the audition sense during the vehicular run at a high speed equal to or higher than 100 Km/h. Furthermore, it becomes apparent that a vehicular run at which all sound elements compete with one another and a balance of these sound elements becomes especially important is the steady state run at the vehicle speed of about 40 through 100 Km/h. On the other hand, a user requirement for the gear noise reduction is concentrated into the same vehicle speed region. This is because the vehicle generally and mainly runs at the above-described traveling speed region. In this addition, the engine noise and the wind noise whose development frequencies are the same as the gear noise are reduced by an improvement in the vehicle body. Thus, it may be considered that the gear noise becomes prominent. Therefore, according to the present invention, an attention has been paid to the steady state run at the vehicle speed region of 40 through 100 km/h which has a high contribution degree to the gear noise.

1.4 Detection of the Projection Quantity of the Object Sound (Sound to be Detected) Under the Background Noise.

Figure 7:
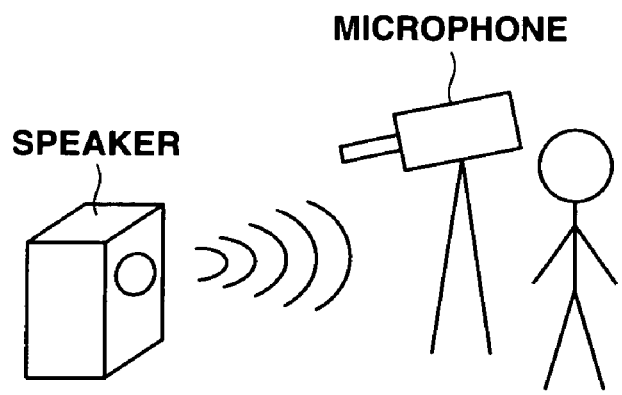
FIG. 7 is an explanatory view for explaining a detection experiment related to a projection quantity of an object sound under a background noise from an audible limit in a case of the embodiment according to the present invention.

An attention is paid to a part at which the pure sound (pure tone) is projected from the background noise and its projection part measurement was carried out. In order to approach a little from a condition of the equi-loudness curve to an actual sound environment, a sufficiently loud pure sound (pure tone) is, at first, outputted from the speaker at a relatively quiet sound environment (a particular sound output is not carried out), the output of the pure sound (tone) is gradually reduced, a frequency analysis using the FFT analyzer is carried out at a level at which the pure sound is inaudible, the projection quantity from the background noise is detected, and its value is set as ΔA. A situation of this experiment is shown in FIG. 7. The experiment was carried out in the way described below. That is to say, using a 12 cm full-range speaker in a space having a dimension of a lateral length of 15 meters, a depth of 3.5 meters, and a height of 3.5 meters, a sinusoidal wave programmed by a sampling generator in a pseudo manner was developed and was evaluated by three measured persons. It is noted that the automotive vehicle drive was supposed and the object sounds of three kinds: namely, (1) sweep (a continuous variation in the frequency) from a low frequency region (measured for each 100 Hz between 100 and 1000 Hz and measurement for each 500 Hz between 1000 Hz and 6000 Hz); (2) the sweep from the high frequency; and (3) the frequency variation at random were measured. It is noted that the measured values are average values of the three measured persons and the results of evaluations are shown in FIG. 8.

Figure 8:
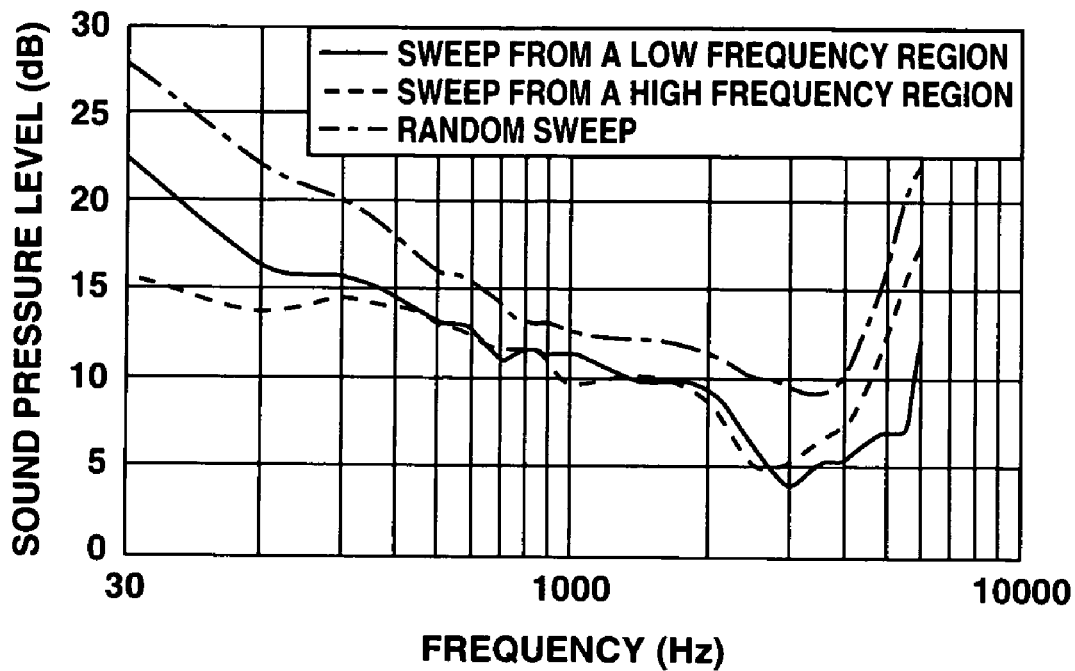
FIG. 8 is integrally a frequency characteristic graph representing evaluation results on the detection experiment related to the projection quantity under the background noise in a case of the embodiment according to the present invention shown in FIG. 7.

It was appreciated that these results shown in FIG. 8 indicated that ΔA had a tendency approaching to the equi-loudness (curve). In addition, the sweep from the low frequency indicated that ΔA was small value at the high frequency region (3000 Hz or higher). On the other hand, the sweep from the high frequency indicated that ΔA was a small value at an extremely low frequency region (400 Hz or lower). In addition, the object sound varied at random could not be heard up to a high sound pressure level over a whole frequency region measured according to the other two conditions. This is because of a practice in the human's audition sense (sense of hearing). This situation is the same as a case in which the engine speed is increased or decreased during the vehicular acceleration or deceleration so that the frequency of the gear noise development is swept. The catching of the gear noise in the human's ears during the acceleration or the deceleration may be considered to be caused by the above-described fact.

Figure 9:
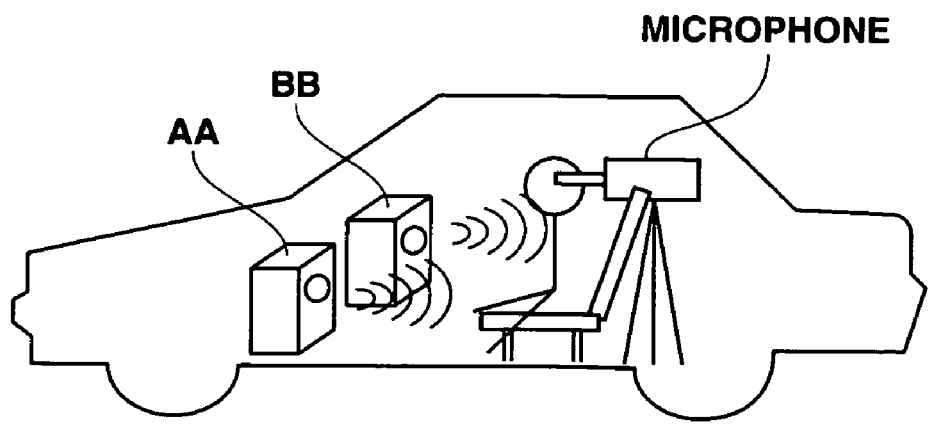
FIG. 9 is an explanatory view for explaining actual detection experiment situation related to the projection quantity of the object sound under the background noise in the vehicular passenger compartment.

1.5 Detection of projection quantity of the object sound under the vehicular passenger compartment background noise. As shown in FIG. 9, each sound pressure level characteristic of the three sound environments of following items 1), 2), and 3) in a generally available small-sized automotive vehicle was tested. First, speaker ΔA outputs the vehicular passenger noise during the vehicular run and speaker BB outputs the pure sound supposing the gear noise (gear sound) to measure projection quantity ΔA from the vehicular passenger compartment.

1) (First Sound Environment)

With the vehicular passenger compartment sound during a steady-state run at which the vehicle speed is constant as the background noise, the sound environment is the outputs of three-pattern (0 dB, +10 dB, and −10 dB), amplitude increase or decrease (the same condition as the case of FIG. 8)

2) (Second Sound Environment)

The vehicular passenger compartment sound during the steady-state run at three-pattern vehicle speeds (50, 60, and 70 Km/h) as the background noise (as the vehicular passenger compartment noise) is outputted as the sound environment.

3) (Third Sound Environment)

The sound environment in which only the object sound in which the gear noise is supposed is sweep outputted and a particular sound output other than the object sound is not carried out.

Figure 10:
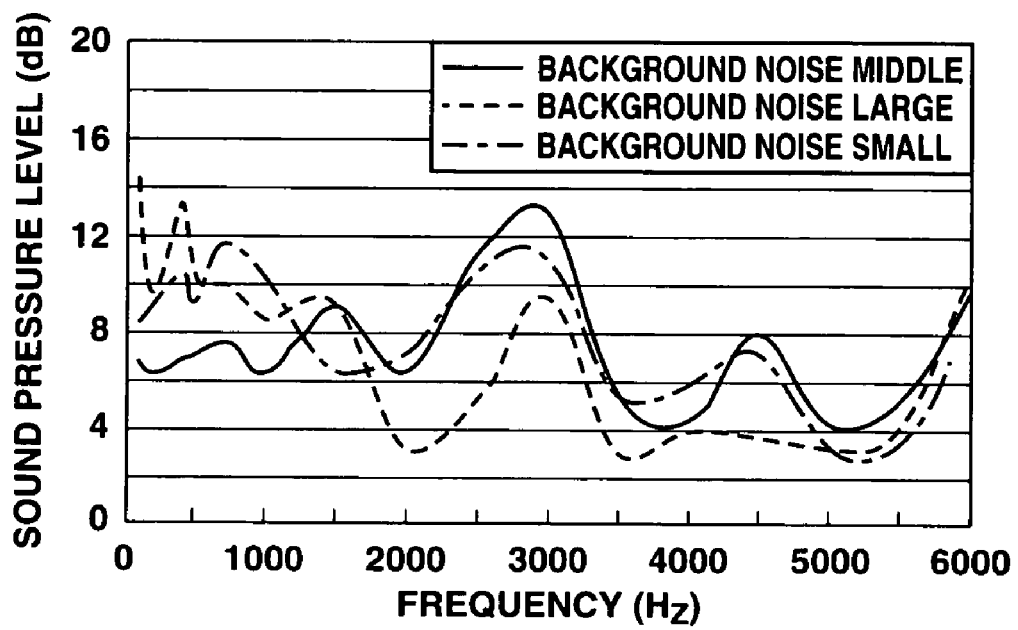
FIG. 10 is integrally a frequency characteristic graph representing evaluation results on a detection experiment (first sound environment) related to the projection quantity under the background noise in the embodiment according to the present invention.
Figure 11:
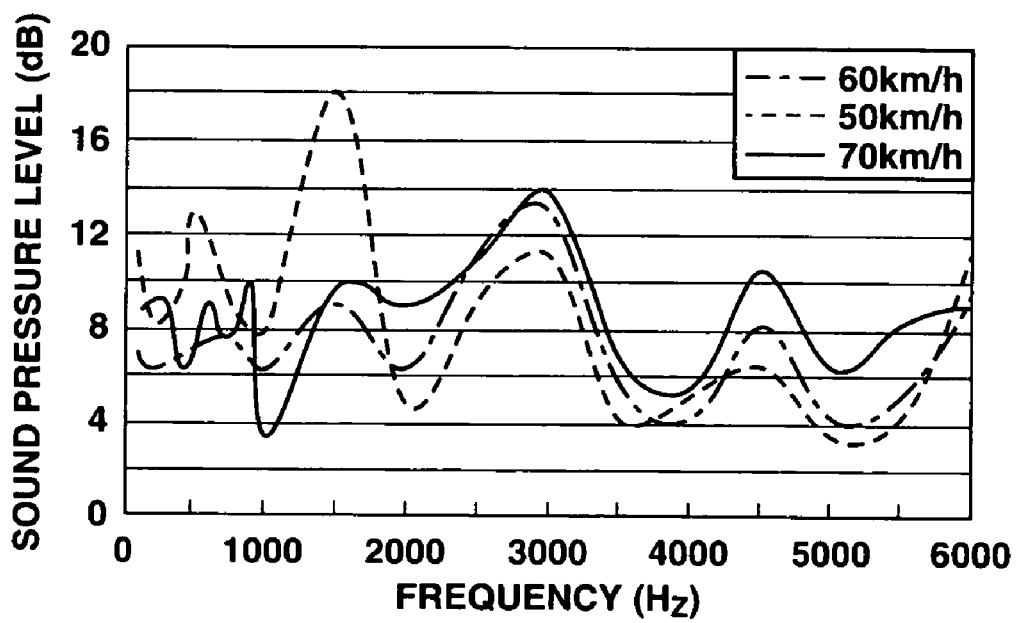
FIG. 11 is integrally a frequency characteristic graph representing evaluation results on a detection experiment (second sound environment) related to the projection quantity under the background noise in a case of the embodiment according to the present invention.
Figure 12:
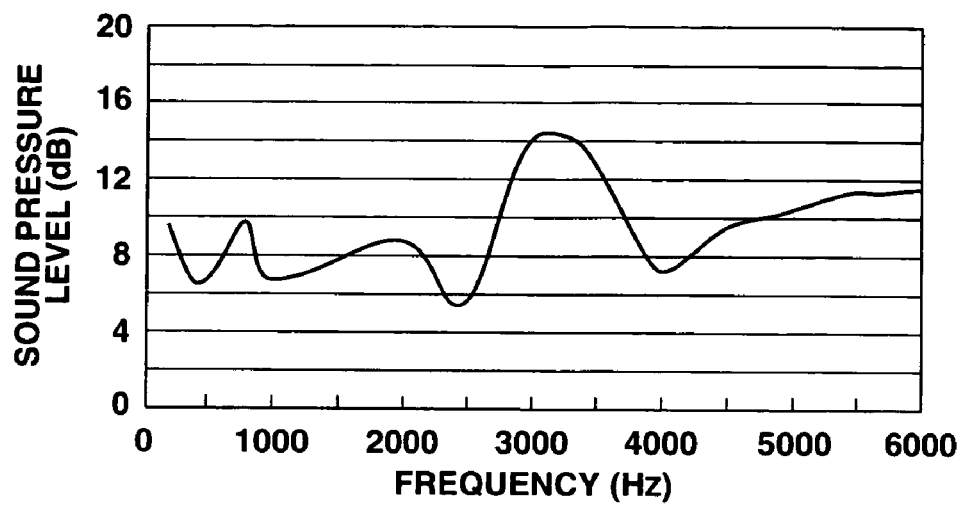
FIG. 12 is integrally a detection experiment (third sound environment) related to the projection quantity under the background noise in a case of the embodiment according to the present invention.

FIGS. 10 through 12 show measurement results. These measurement results are shown in FIGS. 10 through 12. It will be appreciated that these measurement results are different from the equi-loudness curve and indicate that the sense of hearing (audition) of human becomes suddenly dull at the frequency in the vicinity to 3000 Hz. These may be considered to be caused by an influence of the vehicular passenger compartment environment such as a resonance or a coincidence effect. The coincidence effect is a phenomenon in which, when a transmission loss of a wall made of a single material is actually measured, the transmission loss is deviated from a law of constancy of mass and is reduced at a certain frequency or higher. It may be an inherent characteristic of the vehicular passenger compartment enclosed with a glass shield having a thickness of about 3 mm.

1.6 Relationship Between the Number of Teeth of the Gear and the Sound Pressure Level.

Next, in order to enable a calculation of gear dimensions which can exhibit at maximum the masking effect, with a contact ratio determined from the gear dimensions as a parameter, the equation of the sound pressure level with respect to the determined contact ratio is introduced.

Figure 13:
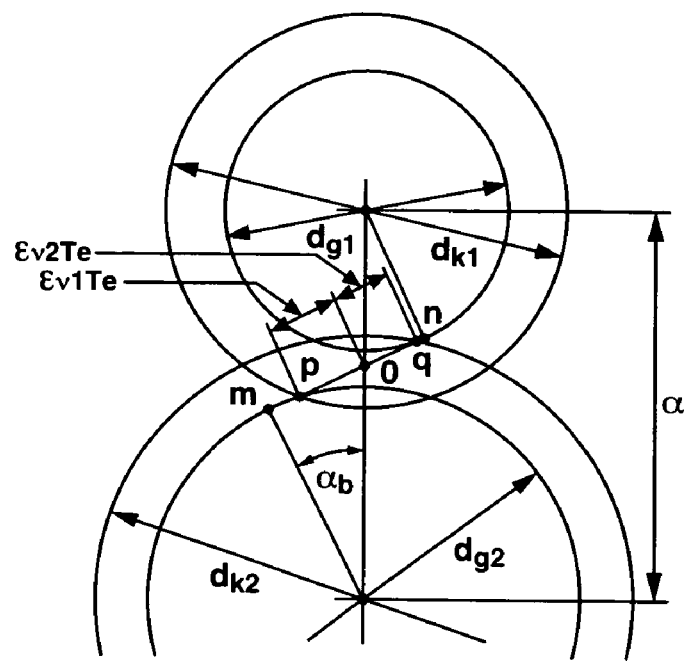
FIG. 13 is a schematic explanatory model view for explaining gear dimensions used in a relation equation between a number of teeth of one gear of the helical gear pair Z and a contact ratio $\epsilon$ of the helical gear pair.

(a) A case of a spur gear:

In a case of the spur gear, only a transverse contact ratio may be considered for the contact ratio. In a case where a spur gear pair is used with a total addendum modification coefficient=0 and a reduction gear ratio is 1, a general equation (1) of the transverse contact ratio can be rearranged into an equation (2). In this case, the contact ratio can be represented by only parameters of only a pressure angle and number of teeth. It is noted that each value in equation (1) is shown in FIG. 13.

$$\varepsilon_v = \frac{\sqrt{(d_{k2}/2)^2 - (d_{g2}/2)^2} + \sqrt{(d_{k1}/2)^2 - (d_{g1}/2)^2} - a\sin\alpha_b}{\pi m_t \cos\alpha_c} \quad (1)$$

$\varepsilon_v$: transverse contact ratio $m_t$: transverse module $\alpha_b$: contact pressure angle $\alpha_c$: standard pressure angle $d_k$: outer diameter $d_g$: base circle diameter Numeral subscript 1: large gear Numeral subscript 2: small gear $$\varepsilon = \frac{\sqrt{(z+2)^2 - (z\cos\alpha_c)^2} - z\sin\alpha_c}{\pi\cos\alpha_c} \quad (2)$$

$\varepsilon$: contact ratio z: number of teeth

Suppose now that the pressure angle is constant. Contact ratio E is a function only by number of teeth Z and can be expressed in the way as described in an equation (3).

$$\varepsilon = f(Z) \quad (3).$$

Figure 14:
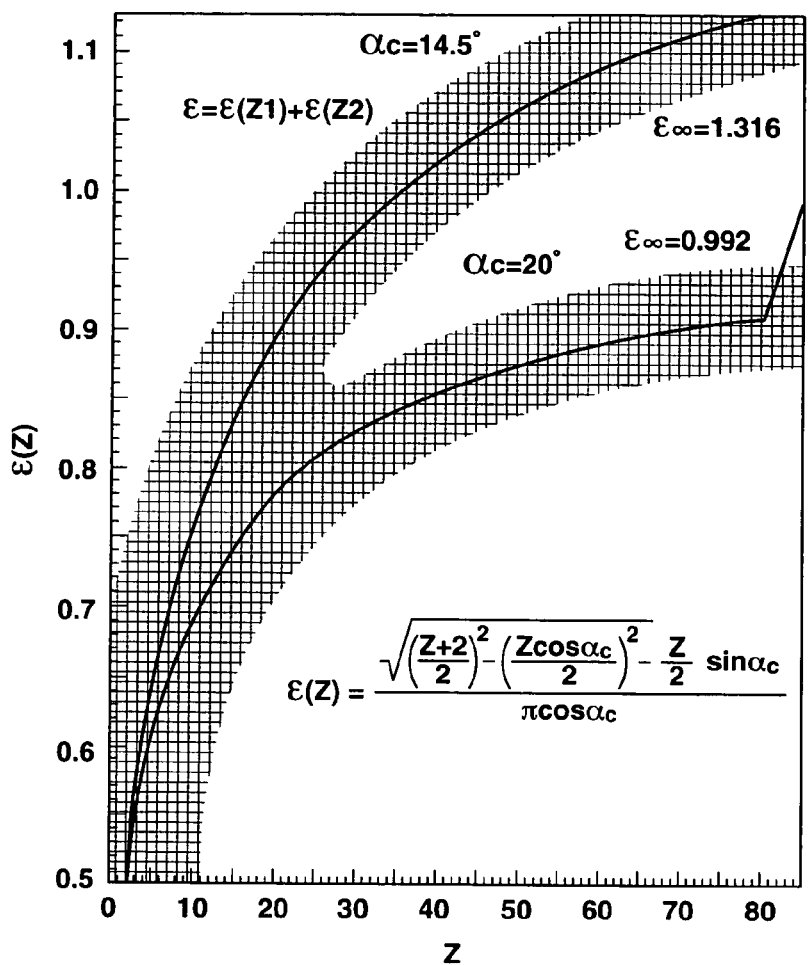
FIG. 14 is diagrammatically an explanatory and characteristic view for explaining a relation between number of teeth Z and contact ratio E of the helical gear pair in a case of the embodiment according to the present invention.

According to a Japanese book titled Involute Profile Shifted Gears (pages 74 to 81) authored by Takashi NAKATA published by the Japan Society of the Mechanical Engineers (first edition) in 1994, the function to derive contact ratio E given in equation (3) can be expressed in a logarithmic function as shown in FIG. 14. For example, in a case where the pressure angle is 20°, it is possible for contact ratio E to be represented in an equation (4).

$$\epsilon = 2 \times (0.1 \ln(Z) + 0.46) \quad (4)$$

Furthermore, in a case of a helical gear pair, in addition to the above-described contact ratio (transverse contact ratio), it is necessary to add an overlap ratio. The overlap ratio is given in the following equation (5).

$$\varepsilon_\beta = \frac{b \sin \beta}{\pi m_n} \quad (5)$$

$\epsilon_\beta$: overlap contact ratio $\beta$: helix angle b: facewidth $m_n$: normal module It is noted that normal module $m_n$ can be represented by an inter-center distance a of centers of each gear pair of the helical and number of teeth Z. Since, in the case of speed reduction ratio 1, the numbers of teeth of driving and driven gears are the same. Thus, $$m_n = \frac{a \cos \beta}{Z} \quad (6)$$

When equation (6) is substituted into equation (5), the following equation (7) is given.

$$\varepsilon\beta = Z \frac{b \tan \beta}{a\pi} \quad (7)$$

Thus, if the helix angle, the width of teeth (facewidth), and the inter-center distance are constant, the overlap contact ratio can be represented in a first-order function of number of teeth Z.

In other words, a total contact ratio of the helical gear pair is a sum of the transverse contact ratio which can be expressed in the logarithmic function for the relation to the number of teeth and overlap ratio which can be expressed in the first-order function. The total contact ratio can be expressed in form of the function of number of teeth Z as follows:

$$\epsilon = C_a \ln(Z) + C_b(Z) + C_c \quad (8)$$

(Ca, Cb, and Cc denote constants and Z denotes the number of teeth)

On the other hand, a contact exciting force which is an exciting source of the gear sound is a sum of the exciting force due to a spring rigidity variation and the exciting force due to the tooth flank error. It is noted that the spring rigidity variation is herein taken into consideration. Suppose that a variation in a teeth surface weight distribution is in a proportional relationship to the contact exciting force. In this supposition, contact exciting force F is given as follows:

$$F \propto \frac{1}{\varepsilon_1} - \frac{1}{\varepsilon_1 + 1}$$

$$(\varepsilon_1 = 1, 2, 3 \ldots)$$

F: contact exciting force $\epsilon_1$: contact ratio (omit figures below the decimal)

Here, if equation (9) is rearranged, $$F \propto \frac{1}{\varepsilon_1^2 + \varepsilon_1} \quad (10)$$

Since a gear sound level (a linear value) has a proportional relationship with the contact exciting force, sound pressure level $L_G$ (dB) of the gear sound is given as follows:

$$L_G \propto \log(F) = \log\left(\frac{1}{\varepsilon_1^2 + \varepsilon_1}\right). \quad (11)$$

$L_G$: sound pressure level of the gear sound (dB)

Suppose that the total contact ratio falls in a narrow range of about 2 through 4. The gear sound (noise) sound pressure level (dB) can be considered to be expressed as an inverse number of the contact ratio. Furthermore, if $\epsilon_1$ (contact ratio (omit figures below the decimal) is replaced with $\epsilon$ (contact ratio) and Te denotes a tooth flank error coefficient, the relationship between gear sound (noise) sound pressure level $L_G$ (dB) and contact ratio $\epsilon$ can be expressed in the following equation (12). It is noted that the tooth flank error can also be said as a teeth profile.

$$L_G \propto \frac{T_e}{\varepsilon} = \frac{T_e}{f(z)} = \frac{T_e}{C_a \ln(Z) + C_b(Z) + C_c} \quad (12)$$

Sound pressure level $L_G$ of the gear sound can be estimated from a meshing frequency (meshing frequency F=revolution speed N×number of teeth (driving side gear) Z/60) calculated from the number of teeth in a case where the vehicle speed is constant and if the pressure angle, the helix angle, and the inter-center distance are constant.

1.7 A Case of a First-Order (Primary) Speed Reducing Gear Train in an Automotive Automatic Transmission.

Figure 15:
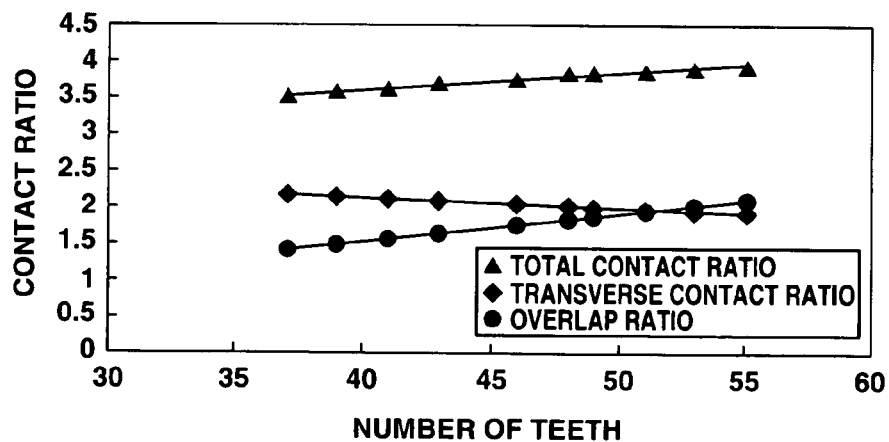
FIG. 15 is a graph representing the relation of the contact ratio to a driving side number of teeth of the helical gear in a case of the embodiment according to the present invention.

FIG. 15 shows a graph of the contact ratio with respect to the number of teeth of the gear of a driving side in a case where the gear dimensions are set in such a way that the transverse contact ratio is set to be high by raising an outer diameter constant as increase as possible with a topland of the driving side gear being 1.5±0.03 mm (semi-topping of 0.2 mm inclusive) and the total addendum modification coefficient being 0.1 or smaller in order to establish a gear cutting and a shaving process by means of the helical gear pair of a speed reduction gear ratio of about 1.1 such as the first-order (primary) speed reducing gear train of the automatic transmission, as one example. It is noted that the pressure angle was 16°, the helix angle was 35°, the facewidth was 20 mm, and the inter-center distance was 125 mm.

As shown in FIG. 15, in a case where a gear dimensions design such as to improve contact ratio as large as possible with the top land value limited was carried out, the transverse contact ratio was indicated as is different from the spur gear shown in FIG. 14. This is because the large module becomes easy to secure the topland. Consequently, the enlargement of the outer diameter constant becomes possible. The large module, namely, the small number of teeth becomes easier to secure the transverse contact ratio.

On the other hand, the overlap contact ratio, as described above, since the facewidth, the helix angle, the inter-center distance are constants, can be approximated by the first-order function of the number of teeth. As the number of teeth becomes increased, the overlap ratio becomes larger. Hence, when the relationship between the total contact ratio and the number of teeth is reviewed, a rise rate of the overlap ratio is larger than a reduction rate in the transverse contact ratio. Then, it was indicated that, as a consequence, the total contact ratio was raised and a substantial linear approximation was resulted if the number of teeth of the driving side gear was in a range from about 35 to 55. In details, the relationship between the number of teeth Z and the gear noise sound pressure level $L_G$, in the gear dimensions, can be expressed in the following equation (13).

$$L_G = \frac{Te}{C_\alpha(Z) + C_\beta} \quad (13)$$

In equation (13), $C_\alpha$ and $C_\beta$ denote constants.

1.8 Setting of Optimum Number of Teeth.

Figure 16:
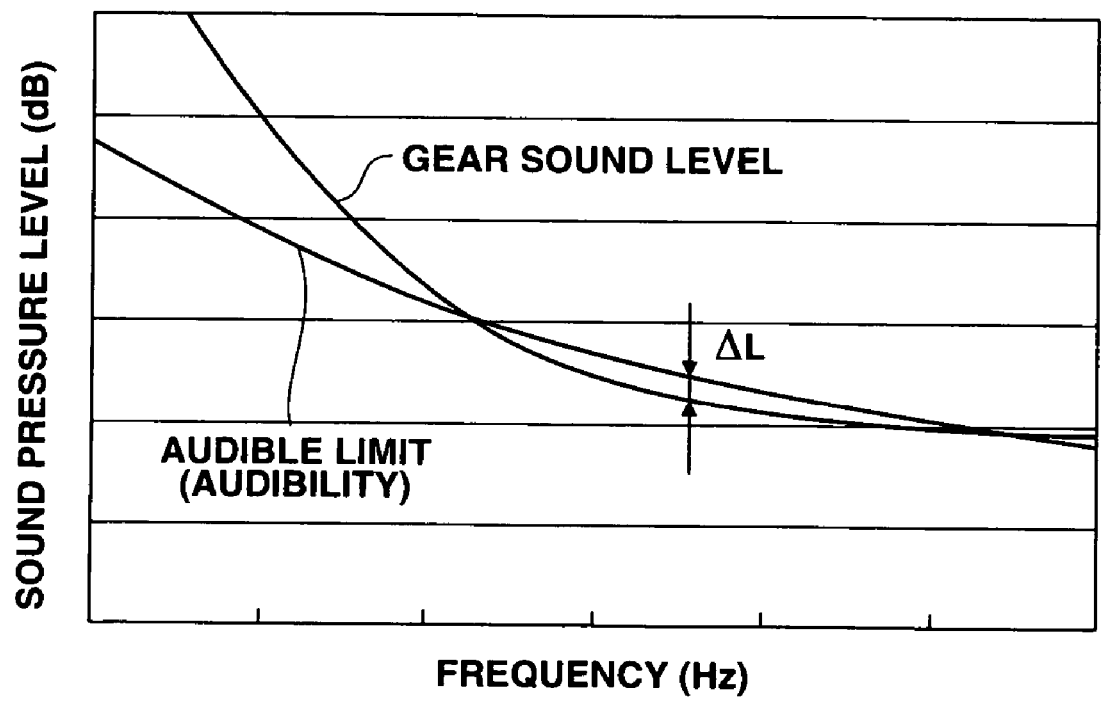
FIG. 16 is a frequency characteristic graph representing a relationship between a sound pressure level of the gear noise and that of the audible limit in a case of the embodiment according to the present invention.

In a case where the vehicle speed is constant, number of teeth Z can be expressed in the meshing frequency F and can be compared with an audible limit (or audibility) line. Then, a process to introduce an optimum number of teeth of each of the gear pair installed within the automotive automatic transmission from equation (13) of the gear noise (sound) sound pressure level determined from the gear dimensions and the audible limit line will be described below. As one example, in a case where the first-order speed reducing gear train of the (vehicular) automotive automatic transmission, the gear noise (sound) sound pressure level is in an inversely proportional relationship to number of teeth of the gear Z if the number of teeth of the driving gear falls within about 35 and 55 from equation (13). That is to say, the relationship between the sound pressure level of the gear noise and audible limit is as shown in FIG. 16. It is noted that ΔL shown in FIG. 16 denotes an allowance level of the gear noise from the sound pressure level of the audible limit at a given frequency and corresponds to $\Delta L_G$ which will be described below if ΔL is a maximum.

Then, number of teeth Z corresponding to a meshing frequency which provides a maximum of $\Delta L_G$ corresponding to the allowance level from the audible limit are introduced. By adopting this method, for example, if the audible limit level (with ΔA considered) under the vehicular passenger compartment background noise different for each category is previously derived, it is possible to set the optimum number of teeth for each of vehicle classes. In addition, since teeth flank error coefficient Te is determined according to a manufacturing quality of the gear, it becomes possible to derive a more inexpensive finishing method from the relationship between $\Delta L_G$ and Te.

2. Optimum Number of Teeth of the Helical Gear Pair in the Preferred Embodiment.

2.1 Construction

For the first-order (primary) speed reducing gear train of the automotive automatic transmission, as shown in FIG. 1, at first, at a gear dimensions determining step S10, the pressure angle and the helix angle are determined from the gear ratio, the inter-center distance of the gear pair, an easiness in the provision of the teeth profile accuracy in a shaving process, a tool life, and so forth. That is to say, gear dimensions determining step S10 determines the gear ratio of the helical gear pair, the inter-center distance of the helical gear pair, the pressure angle of the helical gear pair, and the helix angle of the helical gear pair.

Next, a relationship equation between number of teeth Z (of each helical gear of the helical gear pair) and contact ratio ε is calculated using the values determined at step S10, as a contact ratio calculating step S20. At this time, such a helical gear pair as used in the automatic transmission (AT) can be expressed in the linear function as shown in the following equation (a) which substantially corresponds to the above-equation (8).

$$\epsilon = C_a \cdot \ln(Z) + C_b(Z) + C_c \quad (a)$$

($C_a$, $C_b$, and $C_c$ denote constants and Z denotes the number of teeth)

Next, as a gear sound (noise) sound pressure level calculating step S30, the sound pressure level of the gear noise of the helical gear pair with respect to the frequency using relation equation (b) between number of teeth Z calculated at the contact ratio calculating step S20 and contact ratio ε which corresponds generally to equation (12) is calculated.

$$L_G = T_e / (C_a \cdot \ln(Z) + C_b(Z) + C_c) \quad (b)$$

(wherein, $C_a$, $C_b$, and $C_c$ denote constants, Z denotes the number of teeth, and Te denotes teeth flank error coefficient).

Furthermore, as a frequency determining step at step S40, comparing the sound pressure level calculated at the gear noise (sound) sound pressure level calculating step S30 and the audible limit with respect to the meshing frequency at a predetermined vehicle speed, a frequency region in which allowance level $\Delta L_G$ gives maximum is calculated. It is noted that the predetermined vehicle speed may preferably be set for each of the vehicles and with an age group of a user who purchased the object vehicle taken into consideration.

As an optimum number of teeth calculating step S50, number of teeth Z (=optimum number of teeth $Z_s$) according to meshing frequency F is calculated from the following equation (c). It is noted that, in equation (c), Z denotes the driving side gear number of teeth of the first-order (primary) speed reducing gear pair and N denotes its number of revolutions per unit time.

Meshing frequency F=driving side gear number of teeth Z×number of revolutions of the driving side gear per unit time N (rpm)/60 (c)

It is noted that the driven side gear optimum number of teeth can be set using the gear ratio. It is also noted that the selected (calculated) frequency region at frequency selecting (determining) step S includes the meshing frequency F.

2.2 Action and Advantage

The optimum number of teeth setting method of the helical gear pair in the embodiment according to the present invention is structured as described above. The frequency region in which the sound pressure level of the gear sound is relatively low with respect to the audible limit is selected with the human's audition (sense of hearing) characteristic taken into consideration and the number of teeth corresponding to the selected frequency region is set as the optimum number of each helical gear of the helical gear pair, not by reducing the gear noise through the reduction of the transmission errors of gears (meshing error). Thus, the gear noise can extremely effectively be reduced.

Furthermore, since, from a design stage, it becomes possible to provide the gear pair which is difficult to generate the sound to which the user becomes nervous, the tooth face (tooth flank) finishing process in the manufacturing process can be facilitated. It is noted that meshing frequency F is preferably set to the meshing frequency in which $\Delta L_G$ corresponding to the allowance level from the audible limit gives maximum but the present invention is not limited to this. If the frequency region in which the gear noise is lower than the sound pressure level of the audible limit (it is of course that lowest is preferable), the number of teeth can appropriately be set. In addition, if there is no frequency region in which the gear noise whose sound pressure level is lower than that of the audible limit, the reduction effect of the gear noise to some degree can be achieved if the frequency region in which the sound pressure level of the gear noise is at least relatively lower than the sound pressure level of the audible limit is selected. It is noted that the helical gear mounted in the vehicular automatic transmission is exemplified by a U.S. Pat. No. 6,012,350 issued on Jan. 11, 2000 and the speed reducing gear train mounted in the vehicular automatic transmission is exemplified by a U.S. Pat. No. 5,842,947 issued on Dec. 1, 1998, the disclosures of both of the United States patents being herein incorporated by reference.

This application is based on a prior Japanese Patent Application No. 2005-270261 filed in Japan on Sep. 16, 2005, The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A manufacturing method for a helical gear pair, comprising:
    determining a gear ratio of the helical gear pair, an inter-center distance between centers of the helical gear pair, a pressure angle of the helical gear pair, and a helix angle of the helical gear pair;
    calculating a relationship between a contact ratio of the helical gear pair and a number of teeth of each helical gear of the helical gear pair on the basis of the determined gear ratio, inter-center distance, pressure angle, and helix angle;
    calculating a sound pressure level of a gear sound of the helical gear pair at a meshing frequency of the helical gear pair from the relationship between the number of teeth of each helical gear of the helical gear pair and the contact ratio;
    comparing the calculated sound pressure level of the gear sound with the sound pressure level of an audible limit with respect to the meshing frequency of the helical gear pair at a predetermined vehicle speed of an automotive vehicle in which the helical gear pair is mounted to select a frequency region in which the calculated sound pressure of the gear sound is low compared to the sound pressure level of the audible limit; and
    setting the number of teeth of each helical gear of the helical gear pair corresponding to the selected frequency region to an optimum number of teeth of each helical gear of the helical gear pair; and
    manufacturing the helical gear pair on the basis of the set optimum number of teeth of each helical gear of the helical gear pair.

2. The manufacturing method for the helical gear pair as claimed in claim 1, wherein, when the frequency region is selected, the frequency region in which the sound pressure level of the gear sound is lower than the sound pressure level of the audible limit is selected.

3. The manufacturing method for the helical gear pair as claimed in claim 1, wherein, when the frequency region is selected, the frequency region in which the sound pressure level of the gear sound is low compared to the sound pressure level of the audible limit is selected.

4. The manufacturing method for the helical gear pair as claimed in claim 1, wherein the audible limit is set on the basis of the sound pressure level of a background noise other than the gear sound.

5. The manufacturing method for the helical gear pair as claimed in claim 1, wherein the relationship between the contact ratio and the number of teeth of each helical gear of the helical gear pair is calculated from the following equation:

$$\epsilon = C_a \ln(Z) + C_b(Z) + C_c,$$

wherein $C_a$, $C_b$, and $C_c$ denote constants and Z denotes the number of teeth of each helical gear of the helical gear pair.

6. The manufacturing method for the helical gear pair as claimed in claim 1, wherein the helical gear pair is used in a speed reducing gear train of a vehicular automatic transmission and wherein, when the frequency region is selected, the meshing frequency at the predetermined vehicle speed is included in the selected frequency region.

7. The manufacturing method for the helical gear pair as claimed in claim 6, when the sound pressure level ($L_G$) of the gear sound of the helical gear pair is calculated, with the contact ratio approximated by a first-order function, the sound pressure level is calculated as follows:

$$L_G = \frac{Te}{C_\alpha(Z) + C_\beta}$$

wherein $C_\alpha$ and $C_\beta$ denote constants, Z denotes the number of teeth of the helical gear, Te denotes a teeth flank error coefficient.

8. The manufacturing method for the helical gear pair as claimed in claim 7, wherein, when the frequency region is selected, the frequency region which provides a maximum allowance level ($\Delta L_G$) for the sound pressure level of the audible limit with respect to the meshing frequency at the predetermined vehicle speed is selected.

9. The manufacturing method for the helical gear pair as claimed in claim 6, wherein, when the optimum number of teeth of each helical gear of the helical gear pair is set, the following relation equation is used: F (meshing frequency)=a number of teeth Z of a driving side helical gear×number of revolutions per unit time of the driving side helical gear pair N (rpm)/60 and the number of a driven side gear of the helical gear pair is set using the gear ratio.

10. The manufacturing method for the helical gear pair as claimed in claim 1, wherein the predetermined vehicle speed is preset for each vehicle in which the helical gear pair are mounted and according to an age group of users who purchased of the same vehicle.

* * * * *